(12) United States Patent
Beale et al.

(10) Patent No.: US 11,722,258 B2
(45) Date of Patent: *Aug. 8, 2023

(54) WIRELESS TELECOMMUNICATIONS APPARATUS AND METHODS

(71) Applicant: Sony Group Corporation, Tokyo (JP)

(72) Inventors: Martin Warwick Beale, Basingstoke (GB); Shin Horng Wong, Basingstoke (GB); Samuel Asangbeng Atungsiri, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 144 days.

This patent is subject to a terminal disclaimer.

(21) Appl. No.: 17/328,127

(22) Filed: May 24, 2021

(65) Prior Publication Data

US 2021/0281365 A1    Sep. 9, 2021

Related U.S. Application Data

(63) Continuation of application No. 16/334,366, filed as application No. PCT/EP2017/072025 on Sep. 1, 2017, now Pat. No. 11,018,812.

(30) Foreign Application Priority Data

Sep. 30, 2016  (EP) ..................................... 16191978

(51) Int. Cl.
*H04L 1/1812*  (2023.01)
*H04L 1/1829*  (2023.01)
(Continued)

(52) U.S. Cl.
CPC .......... *H04L 1/1816* (2013.01); *H04L 1/1607* (2013.01); *H04L 1/1861* (2013.01);
(Continued)

(58) Field of Classification Search
None
See application file for complete search history.

(56) References Cited

U.S. PATENT DOCUMENTS 10,868,657 B2 * 12/2020 Pan .................... H04W 72/0446
11,018,812 B2 *  5/2021 Beale .................... H04L 5/0064
(Continued)

FOREIGN PATENT DOCUMENTS

WO    2018/041251 A1    3/2018
WO    2018/050431 A1    3/2018

OTHER PUBLICATIONS

Cheng et al., "Efficient partial retransmission ARQ strategy with error detection codes by feedback channel", IEE Proceedings Communication vol. 147 No. 5, Oct. 2000, pp. 263-268.
(Continued)

*Primary Examiner* — Faiyazkhan Ghafoerkhan
(74) *Attorney, Agent, or Firm* — Xsensus LLP

(57) ABSTRACT

A retransmission method for use in a telecommunications system, the method comprising: transmitting, to a terminal, first data in a set of identified resources allocated for the transmission of the first data; identifying that a portion of the identified resources has been used to transmit data other than the first data; and retransmitting a subset of the first data, the subset of the first data comprising the portion of the first data that was previously scheduled to be transmitted in the portion of the identified resources.

20 Claims, 9 Drawing Sheets

(51) Int. Cl.
*H04L 5/00* (2006.01)
*H04L 1/1607* (2023.01)
*H04L 1/1867* (2023.01)
*H04L 1/00* (2006.01)

(52) U.S. Cl.
CPC .......... *H04L 5/0044* (2013.01); *H04L 5/0064* (2013.01); *H04L 5/0082* (2013.01); *H04L 1/0067* (2013.01); *H04L 1/1887* (2013.01); *H04L 5/0046* (2013.01); *H04L 5/0091* (2013.01)

(56) References Cited

U.S. PATENT DOCUMENTS

| | | | | |
|---|---|---|---|---|
| 2004/0081103 | A1* | 4/2004 | Sebire | H04L 1/0013 370/252 |
| 2005/0201283 | A1* | 9/2005 | Yoon | H04B 1/707 370/232 |
| 2016/0315744 | A1* | 10/2016 | Choi | H04L 5/0055 |
| 2017/0012740 | A1* | 1/2017 | Shen | H03M 13/13 |
| 2017/0265171 | A1* | 9/2017 | Rico Alvarino | H04L 5/0048 |
| 2017/0317794 | A1* | 11/2017 | You | H04L 5/0051 |
| 2017/0353963 | A1* | 12/2017 | Hong | H04L 5/0091 |
| 2018/0007683 | A1* | 1/2018 | You | H04W 72/0466 |
| 2018/0035332 | A1* | 2/2018 | Agiwal | H04W 28/16 |
| 2018/0042030 | A1* | 2/2018 | Xu | H04W 72/541 |
| 2018/0054800 | A1* | 2/2018 | Yeo | H04L 27/2657 |
| 2018/0070341 | A1* | 3/2018 | Islam | H04L 5/0064 |
| 2018/0092104 | A1* | 3/2018 | Sheng | H04W 74/08 |
| 2019/0165882 | A1* | 5/2019 | You | H04W 72/0446 |
| 2019/0165906 | A1* | 5/2019 | Bala | H04L 27/3488 |
| 2019/0174440 | A1* | 6/2019 | Kwak | H04W 52/0216 |
| 2019/0190654 | A1* | 6/2019 | You | H04L 1/0069 |
| 2019/0190687 | A1* | 6/2019 | Yi | H04L 5/1469 |
| 2019/0222362 | A1* | 7/2019 | Beale | H04L 1/1861 |
| 2019/0246419 | A1* | 8/2019 | Sun | H04W 4/06 |
| 2019/0268096 | A1* | 8/2019 | Takeda | H04L 1/1896 |
| 2019/0268938 | A1* | 8/2019 | Zhao | H04W 48/16 |
| 2019/0288797 | A1* | 9/2019 | Guan | H04L 1/1896 |
| 2019/0306836 | A1* | 10/2019 | Hong | H04L 5/0091 |
| 2019/0357223 | A1* | 11/2019 | Wong | H04W 72/23 |
| 2019/0387533 | A1* | 12/2019 | Papasakellariou | H04W 56/00 |
| 2020/0068592 | A1* | 2/2020 | Papasakellariou | H04W 56/00 |
| 2020/0084081 | A1* | 3/2020 | Yeo | H04W 74/008 |
| 2020/0099499 | A1* | 3/2020 | Yeo | H04L 5/0057 |
| 2021/0281365 | A1* | 9/2021 | Beale | H04L 1/1816 |

OTHER PUBLICATIONS

Samsung, "Discussion on URLLC support in NR", 3GPP TSG RAN WG1 Meeting No. 86 R1-166759, Gothenburg Sweden Aug. 22-26, 2016, pp. 1-5.

LG Electronics, "Discussion on outer coding on eMBB data", 3GPP TSG RAN WG1 Meeting No. 86 R1-166898, Gothenburg Sweden Aug. 22-26, 2016, pp. 1-5.

Zte et al., "Multiplexing of eMBB and URLLC", 3GPP TSG RAN WG1 Meeting No. 86 R1-166408, Gothenburg Sweden Aug. 22-26, 2016, 10 pages.

NTT DOCOMO, "New SID Proposal: Study on New Radio Access Technology", 3GPP TSG RAN Meeting No. 71 RP-160671, Goteborg, Sweden, Mar. 7-10, 2016, 8 pages.

Holma et al., "LTE for UMTS OFDMA and SC-FDMA Based Radio Access", Wiley 2009, System Architecture Based on 3GPP SAE, 11 pages.

International Search Report dated Nov. 17, 2017 for PCT/EP2017/072025 filed on Sep. 1, 2017, 12 pages.

Khan Sheraz Ali et al., "Protocols and Mechanisms to Recover Failed Packets in Wireless Networks: History and Evolution", IEEE Access, vol. 4, pp. 4207-4224, XP011620953, DOI: 10.1109/ACCESS.2016.2593605 [retrieved on Aug. 25, 2016].

European Communication Pursuant to Article 94(3) dated Jul. 9, 2020 in European Application No. 17 761 489.8.

* cited by examiner

WIRELESS TELECOMMUNICATIONS APPARATUS AND METHODS

CROSS-REFERENCE TO RELATED APPLICATIONS

The present application is a continuation of U.S. application Ser. No. 16/334,366, filed Mar. 19, 2019, which is based on PCT filing PCT/EP2017/072025, filed Sep. 1, 2017, which claims priority to EP 16191978.2, filed Sep. 30, 2016, the entire contents of each are incorporated herein by reference.

FIELD

The present disclosure relates to wireless telecommunications apparatus and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio (NR) system/new radio access technology (RAT), networks, to efficiently support connectivity for a wide range of devices associated with different applications with different characteristic data traffic profiles, resulting in different devices having different operating characteristics/requirements, such as:

High latency tolerance
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility
Ultra-reliable and Low latency A 3GPP Study Item (SI) on New Radio Access Technology (NR) [1] has been proposed for studying and developing a new Radio Access Technology (RAT) for such a next generation wireless communication system. The new RAT is expected to operate in a large range of frequencies and it is expected to cover a broad range of use cases. Example use cases that are considered under this SI are:

Enhanced Mobile Broadband (eMBB)
Massive Machine Type Communications (mMTC)
Ultra Reliable & Low Latency Communications (URLLC)

eMBB services are typically high capacity services with a requirement to support up to 20 Gb/s. For efficient transmission of large amounts of data at high throughput, eMBB services are expected to use a long scheduling time so as to minimise the overhead, where scheduling time refers to the time available for data transmission between allocations. In other words, eMBB services are expected to have relatively infrequent allocation messages and to have longer time period allocated to data transmission in-between allocation messages.

On the other hand URLLC services are low latency services, wherein the latency is measured from the ingress of a layer 2 packet to its egress from the network, with a proposed target of 1 ms. URLLC data is generally expected to be short such that smaller scheduling times are generally expected compared to eMBB transmissions. As the skilled person will understand, eMBB transmissions and URLLC transmissions have different requirements and expectations, wherein high capacity and low overhead is desired for one while low latency is desired for the other.

It is therefore challenging to conceive a system which can accommodate both needs and where these two very different types of transmissions can be transmitted in a satisfactory manner. In view of this, there is a desire to provide arrangements and systems where high capacity and low latency transmissions can be communicated at the same time while trying to optimise resources utilisation for the system as a whole and for each type of transmission. In particular, in cases where there is a conflict between two transmissions, it could be beneficial to provide an arrangement where any repair mechanism would assist with an efficient use of the resources within the network.

SUMMARY

The present disclosure can assist addressing or mitigating at least some of the issues discussed above.

Respective aspects and features of the present disclosure are defined in the appended claims.

From one perspective, there has been provided a retransmission method for use in a telecommunications system, the method comprising: transmitting, to a terminal, first data in a set of identified resources allocated for the transmission of the first data; identifying that a portion of the identified resources has been used to transmit data other than the first data; and retransmitting a subset of the first data, the subset of the first data comprising the portion of the first data that was previously scheduled to be transmitted in the portion of the identified resources. By retransmitting the subset of the first data, rather than all of the first data, the retransmission procedure may be made more efficient. It is also noteworthy that by "retransmitting" it is meant that the transmission if attempted for the second time but, as the skilled person will appreciate, in a case where the transmission of the first data was punctured by the other data, some or all of the subset of the data may not have been transmitted at all in the original time unit. In this case it can be transmitted for the first time in a subsequent time unit ("retransmitted").

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLES

Figure 1:
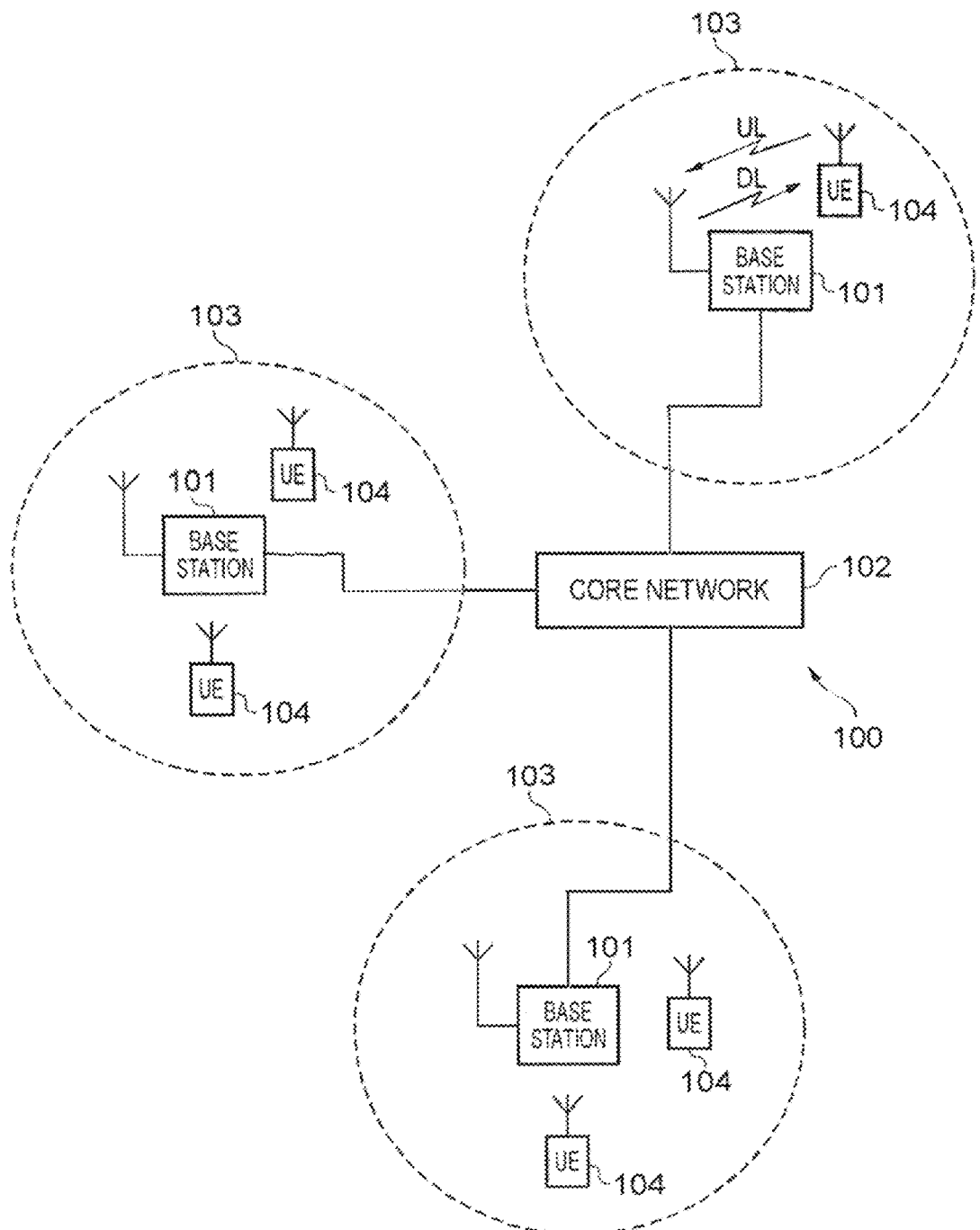
FIG. 1 schematically represents some elements of a conventional LTE-based mobile telecommunications network/system.

FIG. 1 is a schematic diagram illustrating a network architecture for an LTE-based wireless mobile telecommunications network/system 100. Various elements of FIG. 1 and their respective modes of operation are well-known and defined in the relevant standards administered by the 3GPP® body, and also described in many books on the subject, for example, Holma H. and Toskala A [2]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
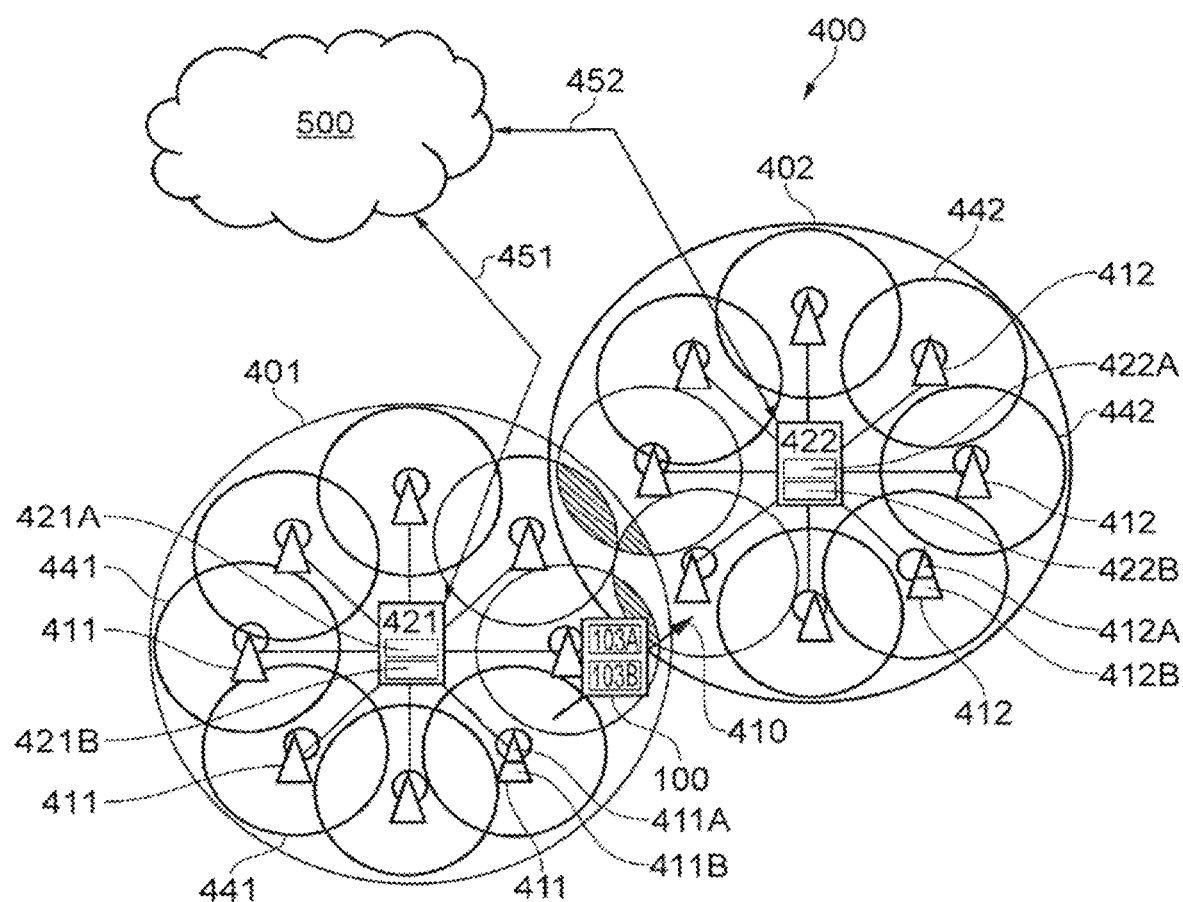
FIG. 2 schematically represents some elements of another type of wireless telecommunications network/system.

FIG. 2 is a schematic diagram illustrating a network architecture for a new RAT wireless mobile telecommunications network/system 300 based on previously proposed approaches and which may be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 500 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 500 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. For simplicity the present description assumes communications for a given terminal device are routed through one of the distributed units, but it will be appreciated in some implementations communications associated with a given terminal device may be routed through more than one distributed unit, for example in a soft handover scenario and other scenarios. That is to say, references herein to communications being routed through one of the distributed units should be interpreted as references to communications being routed through one or more of the distributed units. In this regard, the particular distributed units through which a terminal device is currently connected through to the associated controlling node may be referred to as active distributed units for the terminal device. The active subset of distributed units for a terminal device may comprise one or more than one distributed units (TRPs). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein for handling mobility/handovers in a wireless telecommunications system may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

The terminal device 400 comprises a transceiver unit 400A for transmission and reception of wireless signals and a processor unit 400B configured to control the terminal device 400. The processor unit 400B may comprise various sub-units for providing functionality in accordance with embodiments of the present disclosure as explained further herein. These sub-units may be implemented as discrete hardware elements or as appropriately configured functions of the processor unit. Thus the processor unit 400B may comprise a processor unit which is suitably configured/programmed to provide the desired functionality described herein using conventional programming/configuration techniques for equipment in wireless telecommunications systems. The transceiver unit 400A and the processor unit 400B are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 400 will in general comprise various other elements associated with its operating functionality, for example a power source, user interface, and so forth, but these are not shown in FIG. 2 in the interests of simplicity.

The first and second controlling nodes 321, 322 in this example are functionally identical but serve different geographical areas (cells 301, 302). Each controlling node 321, 322 comprises a transceiver unit 321A, 322A for transmission and reception of communications between the respective controlling nodes 321, 322 and distributed units 311, 312 within their respective communication cells 301, 302 (these communications may be wired or wireless). Each controlling node 321, 322 further comprises a processor unit 321B, 322B configured to control the controlling node 321, 322 to operate in accordance with embodiments of the present disclosure as described herein. The respective processor units 321B, 322B may again comprise various sub-units for providing functionality in accordance with embodiments of the present disclosure as explained herein. These sub-units may be implemented as discrete hardware elements or as appropriately configured functions of the processor unit. Thus, the respective processor units 321B, 322B may comprise a processor unit which is suitably configured/programmed to provide the desired functionality described herein using conventional programming/configuration techniques for equipment in wireless telecommunications systems. The respective transceiver units 321A, 322A and processor units 321B, 322B for each controlling node 321, 322 are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the controlling nodes 321, 322 will in general comprise various other elements, for example a power supply, associated with their operating functionality.

The respective distributed units (TRPs) 311, 312 in this example are functionally identical but serve different parts of their respective cells. That is to say, the distributed units are spatially distributed through their respective communication cells to support communications for terminal devices at different locations within the cells, as schematically indicated in FIG. 2. Each distributed unit 311, 312 comprises a transceiver unit 1311A, 1312A for transmission and reception of communications between the respective distributed units 311, 312 and their associated controlling node 321, 322 and also for transmission and reception of wireless radio communications between the respective distributed units 311, 312 and any terminal device they are currently supporting. Each distributed unit 311, 312 further comprises a processor unit 1311B, 1312B configured to control the operation of the distributed unit 311, 312 in accordance with the principles described herein. The respective processor units 1311B, 1312B of the distributed units may again comprise various sub-units. These sub-units may be implemented as discrete hardware elements or as appropriately configured functions of the processor unit. Thus, the respective processor units 1311B, 1312B may comprise a processor unit which is suitably configured/programmed to provide the desired functionality described herein using conventional programming/configuration techniques for equipment in wireless telecommunications systems. The respective transceiver units 1311A, 1312A and processor units 1311B, 1312B are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the distributed units 311, 312 will in general comprise various other elements, for example a power supply, associated with their operating functionality.

As discussed above, mobile communications networks such as network 100 or network 300 may be used to carry transmissions for services with a variety of constraints, such as traffic which are high capacity and have some tolerance to delay and traffic which is low capacity but with a low tolerance to delay. While the principles of the disclosure will be illustrated in the context of a mobile network where a network element (e.g. TRP, eNB, BTS, . . . ) transmits eMBB and URLLC data to a mobile unit, it will be appreciated that the same principles apply to 3G networks, LTE networks or any other suitable network and to any appropriate type or types of data. Likewise, the same principles and teachings can also be used for uplink transmissions from a mobile device to a network receiver (e.g. BTS, eNB, TRP, etc.).

Figure 3:
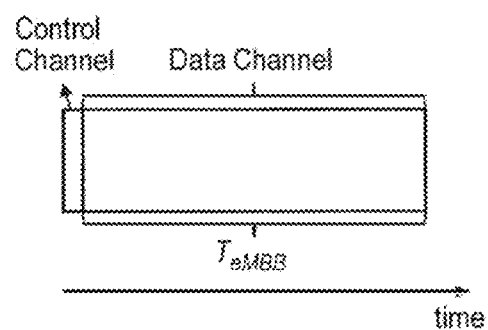
FIG. 3 schematically represents an example eMBB transmission in accordance with the present disclosure.
Figure 4:
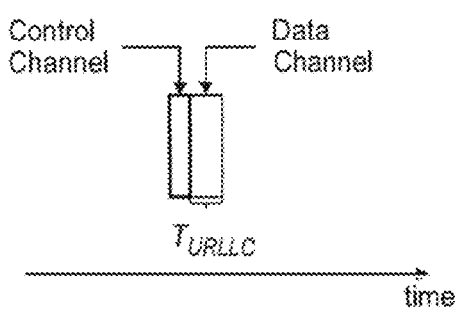
FIG. 4 schematically represents an example URLLC transmission in accordance with the present disclosure.

Returning to the example of eMBB and URLLC traffic, examples of suitable subframe structures for sending eMBB data and URLLC data are illustrated in FIGS. 3 and 4 respectively. It is noteworthy that while the present disclosure is generally provided referring to subframes, the same teachings apply in respect of frames or of any other suitable time unit. An example eMBB subframe structure is shown in FIG. 3 with transmission period $T_{eMBB}$ (e.g. 0.5 ms, 1 ms, 5 ms, 10 ms or 50 ms), where the control channel uses significantly smaller transmission resources than that of the data channel. In this manner, the overhead caused by control transmissions is reduced. On the other hand, if new URLLC data to be sent is identified or received for transmission once the transmission of an eMBB subframe has already started, it would have to be sent in a future subframe which may lead to a delay in transmitting this data. Namely, the delay would be of at least the remaining transmission time for the current eMBB subframe which may create a delay that is not acceptable to the URLLC transmission. Presented differently, as a trade-off for the lower overhead, the transmission delay for longer subframes is increased compared to the transmission delay for shorter subframes. This example eMBB subframe is thus well adapted to the transmission of relatively high capacity and high delay tolerance traffic (e.g. streaming of video, web traffic, etc.).

Now turning to FIG. 4, an example of a URLLC subframe structure is illustrated with a transmission period of $T_{URLLC}$ (e.g. 0.25 ms), where the control and data channels occupy a short duration of time compared to the subframe illustrated in FIG. 3. The transmission length of URLLC data $T_{URLLC}$ is expected to be much smaller than that of eMBB $T_{eMBB}$, that is, $T_{eMBB} \gg T_{URLLC}$. An example requirement currently considered for URLLC is a low latency transmission measured from the ingress of a layer 2 packet to its egress from the network, with a proposed target of 1 ms. With such a subframe structure and compared to that of FIG. 3, the overhead created by the transmission of control information is greater but if new data is received during the transmission of a current subframe, a new subframe can be sent quicker (as the transmission of the current subframe will finish earlier than for a longer subframe) and thus the delay for sending data is relatively smaller. As the skilled person will appreciate, this type of subframe is better adapted for sending low capacity traffic that is sensitive to delay (e.g. emergency and safety systems, health monitoring, etc.), in accordance with the expected low delay requirements for URLLC traffic, than for sending high capacity and high delay-tolerant traffic.

In a mobile network, it is generally expected that the different services can be multiplexed in the same system bandwidth. That would mean that eMBB and URLLC traffic would be scheduled by the network in the same (time and/or frequency) resources and that the mobile unit receiving the transmissions should be able to find the relevant types of transmissions addressed to it. Possible options for multiplexing these different types of traffic and subframes include:

Orthogonal time resources multiplexing. Here the base station uses a scheduling interval that is short enough to meet URLLC latency requirements for both the eMBB and URLLC to allow URLLC and eMBB to be scheduled on orthogonal transmission resources. One disadvantage of this approach is that it creates a relatively large amount of scheduling-related overhead for the eMBB thereby significantly reducing its spectral efficiency. Another option would be to reserve some time periods for URLLC transmissions. One disadvantage would be that the amount of reserved resources would have to be overestimated to try to ensure that resources are always available for URLLC transmissions (with a view to meeting the delay targets) which is likely to result in a sub-optimal use of available resources and thus a loss of capacity for the network (which in turn would translate into a loss of capacity for eMBB traffic as well).

Orthogonal frequency resources, where eMBB and URLLC use different frequency resources. One drawback is that, as when reserving time resources for URLLC (see above), this is likely to result in a reduced overall capacity for the network. Also, in some systems, such as NR or 5G systems, orthogonal frequency resource may not be available because the network can sometimes be expected to serve many users and to occupy a large portion of resources for eMBB transmissions for a relatively long time.

Figure 5:
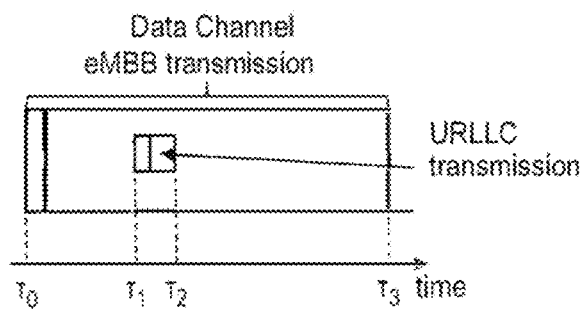
FIG. 5 schematically represents an example multiplexing of eMBB and URLLC transmissions.

With a view to providing multiplexing of URLLC and eMBB transmissions in a manner that aims at providing a low latency URLLC transmission, another option is to occupy a subset of resources already allocated to eMBB for sending URLLC data. This is illustrated with reference to FIG. 5, where an eMBB transmission started at time τ0, and is expected to occupy all available transmission resources until time τ3. At time (or shortly before) τ1, a URLLC packet arrives and it needs to be transmitted immediately. If there are no other available transmission resources, it can then occupy a portion of the eMBB resources as shown in FIG. 5 until time τ2. Different methods for multiplexing the two types of transmissions using resources originally allocated for one of the transmissions only include:

Superposing: The base station schedules the eMBB in the most efficient way, for example with long scheduling intervals as discussed with respect to FIG. 3. Then when a URLLC transport block arrives, this is superposed (for example by use of multi-user superposition) on the eMBB transmission. This means that the eMBB transmission would then suffer from some multi-user superposition interference on those resource elements shared with the URLLC transport blocks. This can result potentially in both the eMBB and the URLLC transmissions being corrupted.

Puncturing: The eNodeB schedules the eMBB in the most efficient way, for example with long scheduling intervals as above. Then the eNodeB punctures the eMBB transmission to create space to fit the arriving URLLC transport block. This means that some of the transmission resources previously designated for use by the eMBB transport blocks are allowed to be used for transmitting URLLC transport blocks instead. The eMBB samples that were designated to be transmitted on the punctured transmission resources are not transmitted at all and are effectively removed from the transmission.

Superposing or puncturing an eMBB transmission as discussed above would affect the likelihood of the eMBB transmission being safely received or recovered and this may lead to a failed transmission. Some possible methods to ensure recovery of the eMBB transport block (TB) include:

Use of an existing HARQ retransmission scheme (or similar) for the data of the eMBB packet to be retransmitted when the data was too corrupted to be recovered. However unlike other transmissions (e.g. legacy LTE packet transmission), eMBB transmissions can be resource intensive and the retransmission would occupy a large portion of the available resources. This would result in a large number of resources being required for retransmitting the corrupted data (which may be much larger than the resources used for the URLLC transmission).

Use outer layer coding, where additional coding is performed on multiple eMBB packets. However this would introduce high latency in receiving the eMBB packets since the UE needs to receive several eMBB packets and the outer layer coding parity bits in order to perform the outer layer decoding process and since the eMBB subframes for sending EMBB packets are expected to be relatively long.

It will thus be appreciated that in these cases, the collision between the eMBB data and the URLLC data is such that this may not be satisfactorily addressed and that the eMBB transmission may not be easily recovered without causing further problems.

Therefore, in the event that a first (e.g. eMBB) transmission has been affected by a second (e.g. URLLC) transmission, the eMBB transmission is less likely to be decoded by the terminal. Some safeguarding arrangements may be used with a view to reducing the likelihood of a terminal failing to decode the first transmissions: see for example EP application EP16189083.5 filed 15 Sep. 2016, the content of which is fully incorporated herein by reference. It is however expected that even with such safeguards in place, and even more so if no such safeguards are used, at least in some cases the terminal will not be able to successfully decode the first transmission. Current systems can enable the terminal to request retransmission of corrupted data, however such a retransmission would use a large amount of resources as the entire eMBB data would have to be retransmitted.

According to the present disclosure, there is provided an arrangement where the efficiency of the retransmissions can be improved, thereby reducing the amount of resources used for repairing a transmission affected by the transmission of another transmission in its allocated resources.

In one example, there is provided an arrangement wherein an indication is received that a terminal has been unable to decode first data (e.g. eMBB data) from a set of identified resources allocated to the terminal for the transmission of the first data; upon receipt of the indication, it is identified that a portion of the identified resources has been used to transfer data other than the first data (e.g. URLLC data); and a subset of the first data is retransmitted, the subset of the first data comprising the portion of the first data that was previously transmitted in the portion of the identified resources. Accordingly, some but not all of the first data can be retransmitted as the source of the data corruption can be identified and thus the corrupted portion can thereby be identified. In turn, this can provide a valuable resources saving, especially in cases where, in the time unit (e.g. frame, subframe, etc.) in question, the resources corrupted by the second transmission are relatively small compared to the total amount of resources allocated to the first transmission as the amount of retransmitted data can thereby be potentially significantly reduced.

More specific example implementations of the present disclosures will now be described, wherein the invention is not limited by the specific examples provided herein but only by the appended claims. For example, while the examples provided herein generally involve an eMBB transmission that has been affected by a puncturing or by superimposed URLLC transmissions, the teachings of the present disclosure are not limited to eMBB and/or URLLC transmissions and these example transmissions are used for illustrative purposes only.

Figure 6:
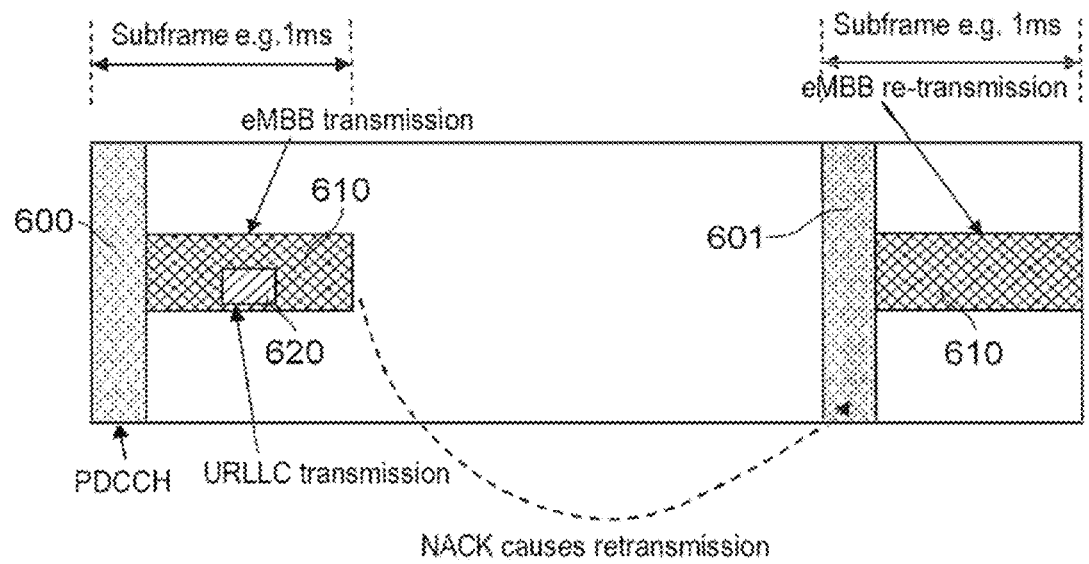
FIG. 6 illustrates an example of a transmission repair using HARQ.

In most of the current mobile networks, the retransmission mechanism implemented is the Hybrid Automatic Repeat reQuest (aka "Hybrid ARQ" or "HARQ") and, as mentioned above, using HARQ is one method available for repairing eMBB transmissions that have been corrupted (punctured or superposed) by URLLC. However, the HARQ retransmission is resource intensive since in a HARQ retransmission, a whole subframe needs to be re-transmitted. On the other hand, the URLLC corruption may have only covered a few resource elements that was constrained in both the time and frequency domains within the resources originally allocated for the eMBB transmission. An example of a conventional repair of an eMBB transmission using HARQ is illustrated in FIG. 6. In a first subframe an eMBB transmission 610 is scheduled by a PDCCH 600. The eMBB transmission 620 is then corrupted by an urgent URLLC transmission 620 in the same subframe. The low delay tolerance of the URLLC transmission 620 caused the transmission of the URLLC data in resources that were allocated for the eMBB transmission 610 (e.g. rather than waiting for the next subframe for resources to be allocated in a conventional PDCCH and specifically for the URLLC transmission). In turn, this causes the decoding of the eMBB transmission to be unsuccessful and the UE to send a NACK feedback to the eNodeB. As per the HARQ procedure, the NACK feedback triggers a retransmission and the eNodeB schedules a HARQ re-transmission of the eMBB transmission in a later subframe labelled in the figure. The same eMBB data 610 is sent again, using resources allocated in PDCCH 601 for the later subframe. The retransmission includes both the non-corrupted data (that is in the resources for 610 not used by transmission 620) and the corrupted data (that is in the resources used by transmission 620).

In accordance with the present disclosure, in cases where a URLLC transmission collides with an eMBB transmission, the amount of retransmitted eMBB bits from the bits that did not collide with the URLLC transmission can be reduced, thereby improving the efficiency of the network and in particular a more efficient method of re-transmission (HARQ or otherwise) for cases where there are collisions between two transmissions, one being scheduled in a controlled channel for a time unit (e.g. eMBB transmission) and another one being transmitted despite not being scheduled in the control channel for the time unit in which it is transmitted (e.g. URLLC transmission for another UE).

In an example of the present disclosure, the retransmitted data corresponds to exactly the corrupted portion of the eMBB transmission, as illustrated with reference to FIG. 7. In this example, where possibly only the eMBB physical bits, or alternatively only the QAM symbols, that were corrupted by the URLLC transmission are re-transmitted. The numbering in FIG. 7 corresponds to that of FIG. 6 but where the retransmitted data 711 corresponds in time and frequency to the portion (e.g. data bit or QAM symbol portion) of eMBB transmission 710 affected by the URLLC transmission 720. This figure shows that in this example the HARQ re-transmission consists of exactly the modulation symbols (mapped from physical bits) that were corrupted in the previous transmission 710. Although in FIG. 7 the retransmitted data 711 is shown in the same time and frequency resources within the subframe as the URLLC transmission causing the corruption, in other implementations in accordance with this example the retransmission 711 will have the same shape and amount of time and frequency resources as the transmission 720 but the retransmission can use different time and/or frequency resources within the subframe for the retransmission.

It is noteworthy that, in some cases it may not be appropriate for the re-transmission to be based on the physical bits that were corrupted, but it may be more appropriate to base the retransmission instead on the QAM symbols (also sometimes referred to as modulation symbols) that were corrupted. This may be especially relevant in cases where there is some interdependency between the QAM symbols. Such interdependency exists, for example, in the following modulation schemes: differential modulation, multi-dimensional modulation and signal space diversity. In such cases, the QAM symbols that were corrupted can be re-transmitted rather than the physical bits.

Figure 7:
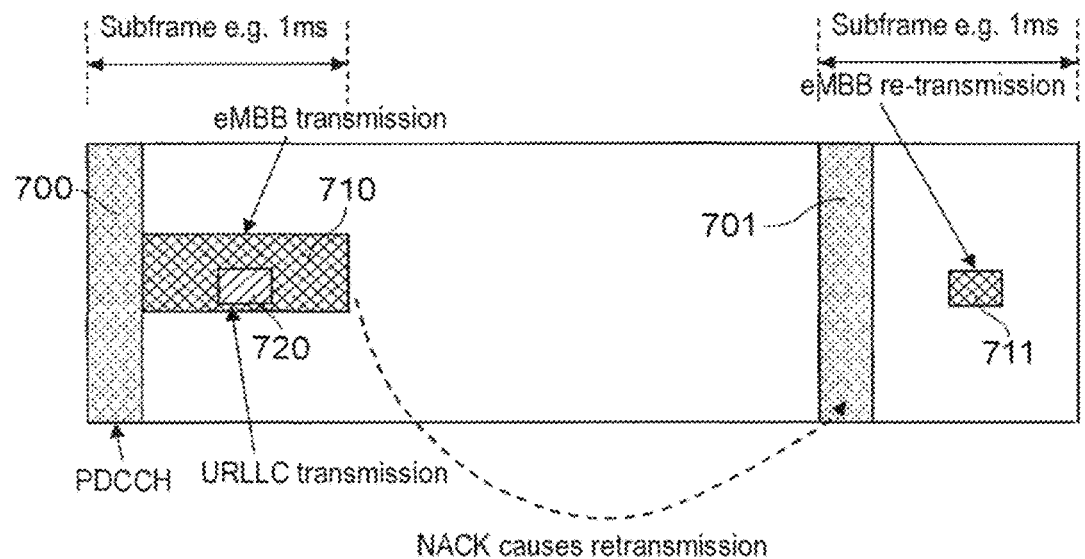
FIG. 7 illustrates an example of a transmission repair according to the present disclosure.

The example illustrated in FIG. 7 shows a retransmission occupying exactly the same physical resources (only in a different subframe) as the physical resources that were corrupted in a previous subframe. Carrying out the retransmission on exactly the same physical resources can be useful since it facilitates the repairing of the first transmission by the terminal. In particular, a UE may implement a "symbol combining" architecture wherein the UE can simply replace the transmission received in the resources for 720 by the retransmission 711 and attempt to decode the transmission 710 based on this re-combined transmission. However, in some cases it may not be possible to allocate resources for the re-transmission 711 in the later subframe that can replicate the shape of the URLLC transmission 720. For example, in some mobile systems, a standard allocation of resources in a PDCCH may only take the shape of resources from the end of the control channel until the end of the subframe. In this case it may not be possible to allocate resources that have the same time and frequency dimensions as the colliding URLLC transmission.

Figure 8:
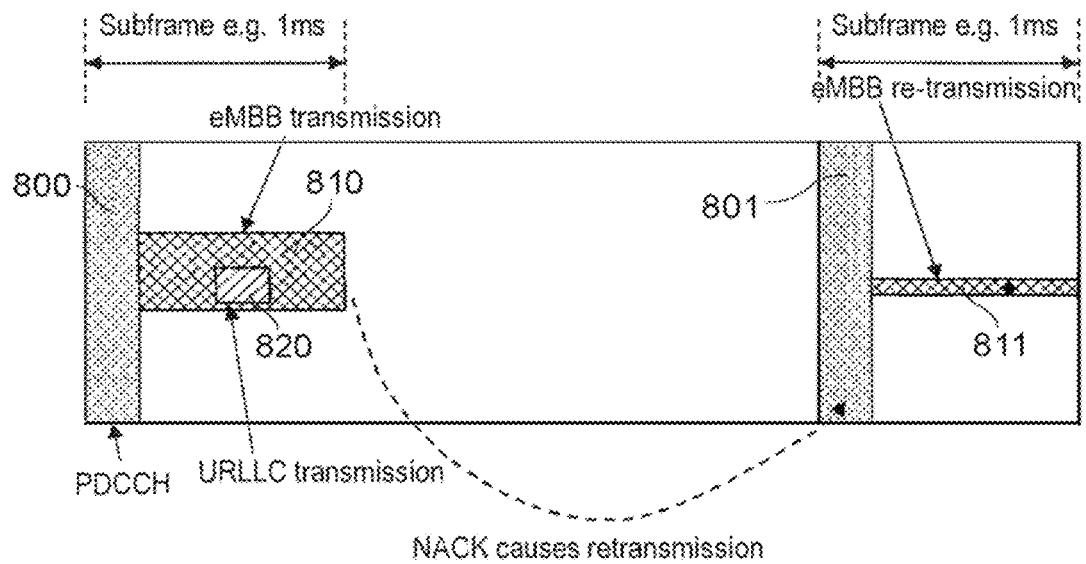
FIG. 8 illustrates an example of a transmission repair according to the present disclosure.

Accordingly, in one example the shape of the re-transmitted resources can be different to the shape of the resources corrupted by the URLLC transmission. For example, the re-transmitted resources could occupy fewer subcarriers over a larger number of OFDM symbols. In such an implementation, these resources could assist with multiplexing this type of retransmission with other eMBB transmissions. An example of such a retransmission is illustrated in FIG. 8. Again, the numbering in FIG. 8 corresponds to that of FIGS. 6 and 7. The retransmission uses different resources 811 within the subframe (compared to the resources used by transmission 820) and the resources contain the same number of resource elements as the resources that were corrupted in the first subframe, in accordance with this first example implementation.

Figure 9:
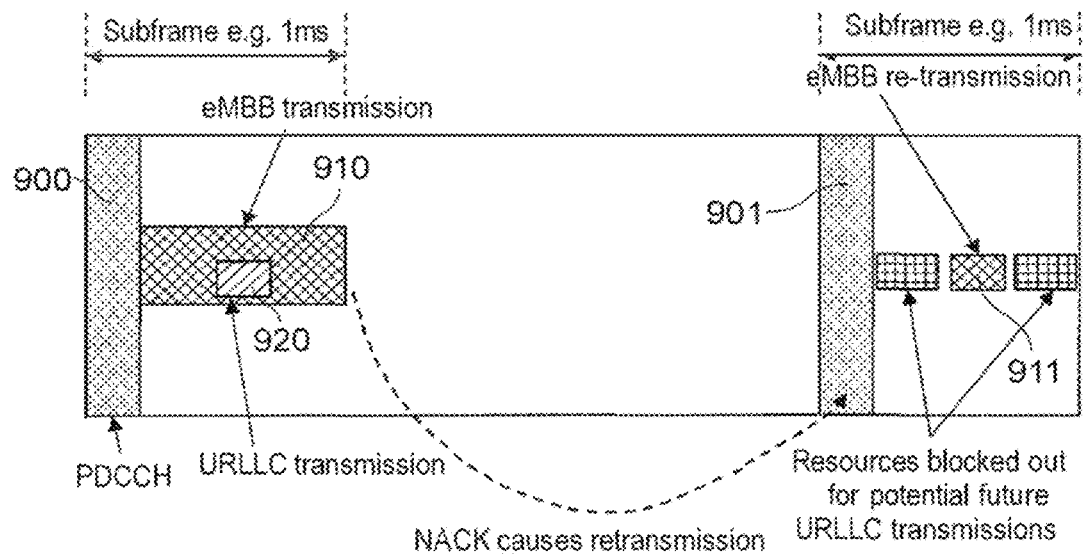
FIG. 9 illustrates an example of a transmission repair according to the present disclosure.

In another example, as illustrated in FIG. 9 an eMBB retransmission 911 uses, in a different subframe, the same physical resources as the corrupting URLLC transmission 920. At the time of scheduling the eMBB re-transmission, the eNodeB may not know whether there will be future urgent URLLC transmissions, but it can reserve the subcarrier range occupied by the eMBB re-transmission 911, in OFDM symbols not used by the eMBB re-transmission, for use by future potential URLLC transmissions. As illustrated in FIG. 9, the eMBB re-transmission uses a subcarrier range over the OFDM symbols occupied by the eMBB retransmission 911 and these subcarriers are unused by the eMBB re-transmission in OFDM symbols before and after the eMBB retransmission 911. These subcarriers and OFDM symbols cannot be assigned to other eMBB transmissions (e.g. because the shape of the available physical resource may not be compatible with the eMBB allocation signalling). These resources are instead blocked out for potential use by future URLLC transmissions. If at a future point in time, a URLLC has to be transmitted urgently, the URLLC scheduler can preferentially schedule the urgent URLLC transmission using these blocked out resources, rather than puncture a previously scheduled eMBB transmission for example.

Figure 10:
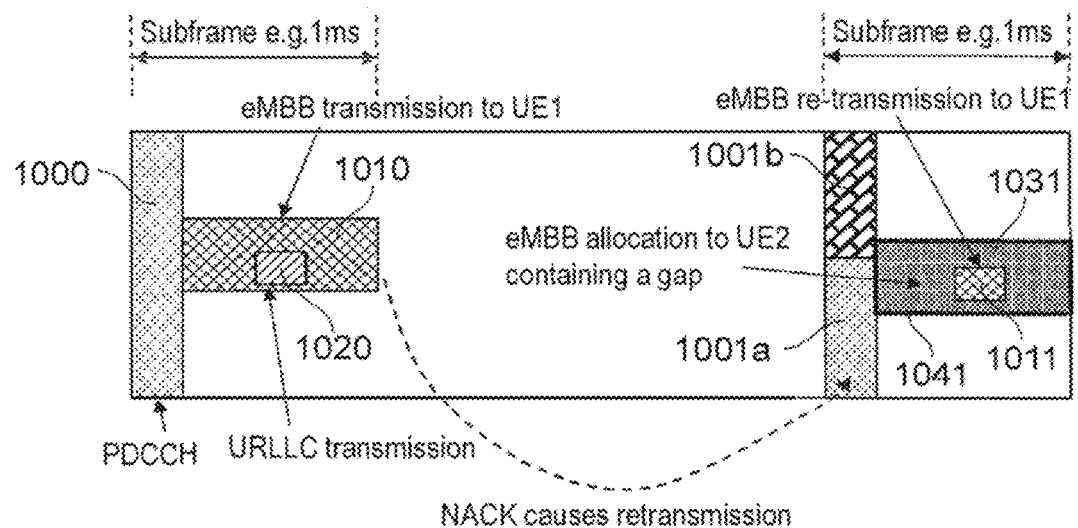
FIG. 10 illustrates an example of a transmission repair according to the present disclosure.

In yet another example, eMBB resources 1031 can be allocated that are of a shape containing a gap, wherein the gap is the size of a URLLC transmission, as illustrated in FIG. 10. The resource allocation signalling currently used in mobile networks does not enable such a type of resource allocation with a gap but another type of resource allocation signalling could easily define a set of resource elements containing a gap. Within a rectangular block of resource elements 1041, the eNodeB can thus schedule:

An eMBB re-transmission to UE1 in resources 1011; and

An eMBB transmission using resource elements containing a gap to UE2 in resources 1031

In the example of FIG. 10 the gap for resources 1011 is of the same shape as the URLLC transmission resources 1020 when the collision occurred but in other examples, the gap may be of a different shape (see for example the discussion above in respect of FIG. 8). Also, while the gap 1011 has been represented being in the middle of the block 1041 in the example of FIG. 10, this is not a requirement in accordance with the present disclosure and in other examples it may for example be at one, two or three edges of the block 1041.

Figure 11:
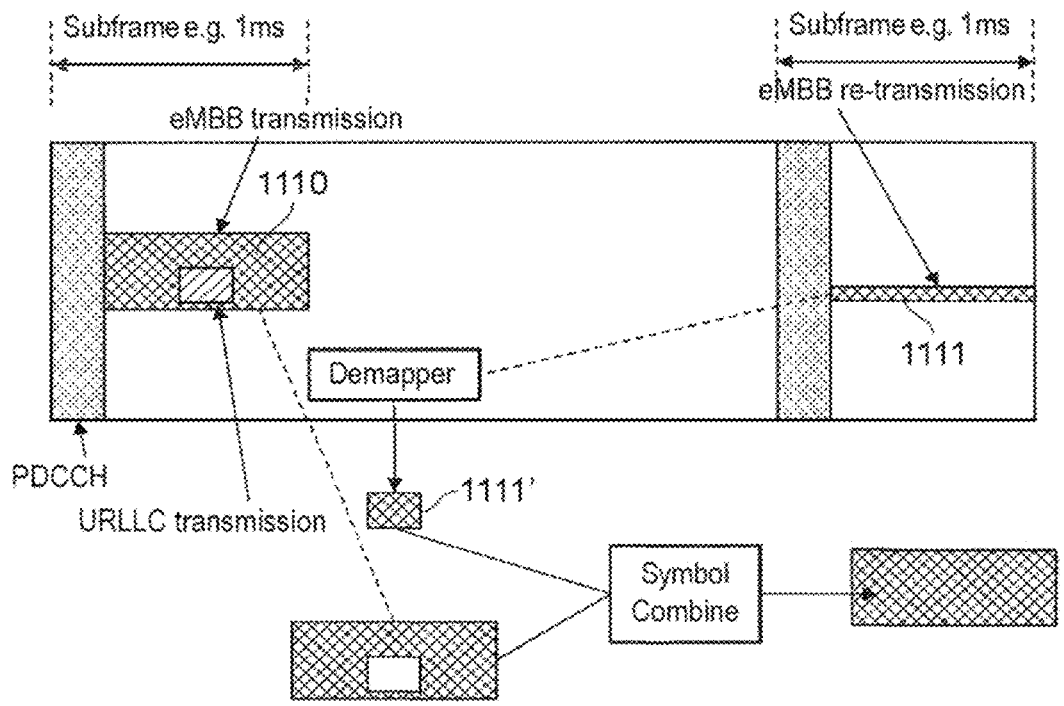
FIG. 11 illustrates an example of a transmission repair according to the present disclosure.

Some of the above example implementations may not allow a symbol combining method to be used, as discussed above, since the Resource Element (RE) locations of the symbols have been moved compared to that of the corrupted REs. This situation can however be addressed by including an RE demapper prior to performing symbol combining. The operation of the demapper is schematically represented in FIG. 11. In brief, the demapper enables the terminal to rearrange the retransmitted resources 1111 to resources 1111' corresponding to the eMBB resources lost with the URLCC collision. The terminal can in some examples be configured to always re-arrange the symbols using the same method (e.g. by defining an order for the symbols, e.g. increasing time then frequency, the other way around or any other suitable order) or the demapping parameters can be indicated to the terminal, for example in the control channel used to schedule the retransmission.

In another example of the present invention, the amount of resource that is re-transmitted can be larger than the amount of resources directly affected by the URLLC collision. For example, it may depend on signalling from the terminal, as will be clear from the discussion below.

In some cases, the URLLC transmission can be transmitted with a different set of reference signals ("RS") to the eMBB transmission. In these cases, the channel estimation used to decode the eMBB transmission may also have been corrupted by the colliding URLLC transmission such that simply retransmitting the corrupted symbols or bits may not be sufficient to repair the eMBB transmission. As the channel estimation algorithm typically averages its channel estimation across subcarriers (in the frequency dimension) and/or OFDM symbols (in the time dimension), the corruption from the URLLC transmission may impact a larger number of resource elements in the receiver than in the transmitter. In other words, the receiving and/or decoding of the REs in the vicinity of the collision area may also be affected even though the REs themselves may not have been changed as a result of the collision between the eMBB and URLLC transmissions. The channel estimation algorithm employed is down to UE implementation and different terminals may average channel estimates across different amounts of resource in one or two dimensions. The type of channel estimation used by the terminal is expected to affect a desired amount of retransmission in a case where reference signals have been affected by the collision but the eNodeB carrying out the retransmission may not be aware of which specific type of channel estimation the terminal is using.

Accordingly, in one implementation, the UE can indicate to the eNodeB how large or how much larger (compared to the collision area) the eMBB re-transmissions can be with a view to increasing the likelihood of a successful repair. The following signalling may be used by the terminal for providing such an indication:

In the UCI (reporting ACK/NACK), a field can indicate how many "extra resource elements surrounding the URLLC collision" need to be re-transmitted. This can be used as a dynamic form of signalling.

In RRC signalling (e.g. at connection setup), the UE can indicate to the eNodeB how many "extra resource elements surrounding the URLLC collision" need to be included in a re-transmission whenever a URLLC transmission collides with an eMBB transmission. This can be used as a semi-static form of signalling. Alternatively, the UE can indicate "type" or "category" information that the eNodeB can use to determine how many extra resource elements surrounding a URLLC collision are required for repair. For example, the UE can indicate that it is a "type" of UE that averages channel estimates across 12 subcarriers. In that case, the eNodeB could decide, for this UE (and other UEs of the same type), to oversize eMBB retransmissions by 12 subcarriers around the edges of the eMBB data that was corrupted and that is being prepared for retransmission.

Figure 12:
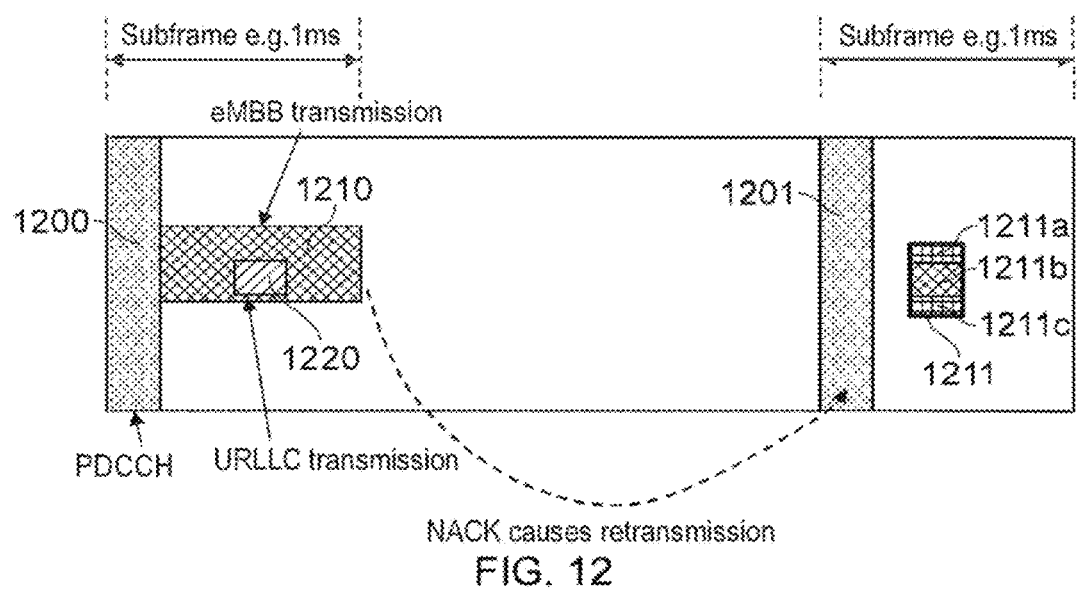
FIG. 12 illustrates an example of a transmission repair according to the present disclosure.

FIG. 12 illustrates a retransmission in accordance with this example implementation. In this example, it is assumed that the terminal has previously indicated to the eNodeB that it is averaging RS in the frequency dimension with an indication of the extent of the averaging or that, when an eMBB repair occurs, $N_{CE}$ extra resource elements need to be transmitted above any corrupted eMBB portion and $N_{CE}$ extra resource elements need to be transmitted below any corrupted eMBB portion. As mentioned above, this can be indicated to the eNodeB via semi-static RRC configuration signalling. The figure shows that the eMBB repair transmission 1211 consists of:

a set of REs 1211b that match the REs that were collided with by URLLC in transmission 1220

$N_{CE}$ REs 1211a above the retransmitted REs that were corrupted by URLLC collision.

$N_{CE}$ REs 1211c below the retransmitted REs that were corrupted by URLLC collision.

The terminal can use the extra sets of $N_{CE}$ REs in order to improve the channel estimates for the retransmitted REs that were corrupted by URLLC collision sent in 1211b in the example of FIG. 12. It can also use these additional REs for HARQ recombination of these surrounding $N_{CE}$ REs as these might also have been affected by the different RS sent in the transmission 1220 and may thus also be repaired with the retransmission.

Figure 13:
FIG. 13 illustrates example additions of extra resources for a retransmission.

While in this example the additional REs used in the retransmission have been added on either side—in the frequency dimension—of the resources used for retransmitting the REs that were used for the URLLC transmission, in other examples they may only be added on either side in the time dimension while in yet further examples they may be added on either side in the time and frequency dimensions. Examples of additional REs used when retransmitting the eMBB transmission have been included in FIG. 13, although the examples of FIG. 13 do not provide an exhaustive list of all possible examples for including additional REs in accordance with the teachings of the present disclosure.

Regardless of the desire to send additional REs when the terminal's channel estimation might have been affected, there may be other cases where more eMBB REs might be transmitted than just the ones that were instead used by the URLCC transmissions.

For example, it may not always be possible to signal to an eMBB UE the allocation for just the eMBB portion that was used by the URLLC transmission as illustrated in FIG. 7. The resource signalling (for example in the DCI) may itself have limited capacity such that it may not be possible to signal every possible amount of retransmission physical resource to the UE.

Now looking at the example of FIG. 8, the allocation shown there might result in a close number of resources elements compared to that for the corrupted resource, however it may not be exactly identical. For example, a URLLC transmission may consist of 7 OFDM symbols and a number of subcarriers, $n_{SC\_URLLC}$, whereas an eMBB transmission may consist of 26 OFDM symbols and a number of subcarriers, $n_{SC\_MBB}$ (where a subframe may consist of 28 OFDM symbols, of which 2 are reserved for control channels). If, for example, the URLLC transmission consisted of 10 subcarriers (a total of 70 resource elements when 7 OFDM symbols are used), the eMBB HARQ repair transmission could consist of 26*2=52 resource elements or 26*3=78 resource elements.

Accordingly, it is proposed that the HARQ re-transmission can in some examples be a rate matched version of the physical bits that were corrupted by the URLLC transmission. The rate matching may occur on physical bits or on QAM symbols (as will be clear from the discussion below) as for some modulation schemes, it may be desirable to re-transmit modulation symbols rather than physical bits (as previously mentioned).

If more REs than the number of corrupted REs (including extra REs for channel estimation or not), have to be used in the retransmission, for example because of limitations in the resource allocation signalling, this can be used to increase the reliability of the retransmission. Also, in some circumstances it will be desired that the "eMBB repair" transmission should be more robust than the resources that were corrupted by the URLLC transmission and more resources can then be allocated to improve the reliability. For example, if the Log-Likelihood Ratios ("LLRs") from the URLLC transmission were added onto a previous eMBB transmission, the LLRs in the "corrupted region" become less reliable than before the corruption and in this case, it may be beneficial to re-transmit the corrupted region with extra reliability (in order to overcome the corruption). In some embodiments, the reception of the eMBB re-transmission will cause the terminal to delete soft channel bits in the region that was corrupted by the URLLC transmission and it may be beneficial if this "eMBB repair" transmission has increased robustness to ensure a safe decoding of the entire eMBB transmission. For example, if the HARQ buffer had previously received 2 HARQ re-transmissions before having a third HARQ re-transmission being corrupted by the URLLC transmission, the "eMBB repair" transmission could be transmitted with three times the amount of resource of the initial HARQ transmission. In other words, the repair re-transmission would correspond to twice the amounts of resource relating to the 2 HARQ re-transmissions that were deleted and one time the amount of resource relating to the soft channel bits that were not received due to the URLLC transmission. In such cases, increased REs can be used to increase the robustness of the repair retransmission.

Whether more resources than just the directly corrupted resources are being used by choice and/or by design, the same principles will apply as the skilled person will recognise.

Figure 14:
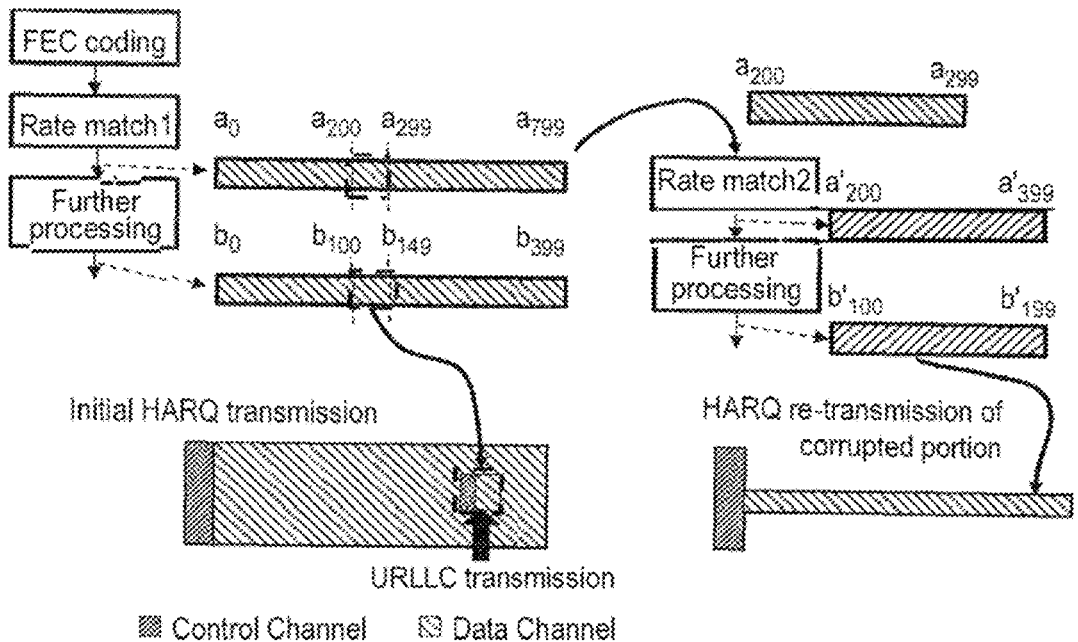
FIG. 14 illustrates an example rate-matching method for use in a retransmission.

FIG. 14 illustrates an example of how a more robust "eMBB repair" re-transmission can be generated through rate matching of physical bits. In this example, a set of 800 physical bits (400 modulation symbols) is transmitted for the eMBB transmission and 100 physical bits (50 modulation symbols) of this transmission are corrupted by a URLLC transmission. In the example of FIG. 14:

The initial transmission is rate matched to create a set of physical bits $a_0 \ldots a_{799}$ These physical bits are further processed to create a set of resource elements $b_0$ to $b_{399}$. The further processing may consist of various operations, including mapping to modulation symbols (in this example, QPSK modulation is envisaged)

The portion of resource elements b100 to b149 were intended to be mapped to a portion of resource that is corrupted by a URLLC transmission, either through puncturing (replacement) or superposition for example.

For the HARQ re-transmission (the "eMBB repair" transmission), the physical bits $a_{200} \ldots a_{299}$ (corresponding to the resource elements that were corrupted by URLLC) are further rate matched, by a block labelled "rate match 2". In this example, these bits are repeated two times to create a physical bit stream $a'_{200} \ldots a'_{399}$.

The physical bits stream $a'_{200} \ldots a'_{399}$ is further processed to produce a set of resource elements $b'_{100} \ldots b'_{199}$.

According to this example, for the same portion of data, twice as many resource elements are used for the retransmission compared to the number of resource elements allocated for the original transmission ($b_{100} \ldots b_{149}$). As a result, this re-transmission is more robust than the initial transmission. Although the example of FIG. 14 shows a retransmission which is similar to the type described with reference to FIG. 8, the skilled person will appreciate that this aspect is merely illustrative and any other type of shape of retransmission may be used as appropriate (the same comment also applies to FIG. 15 discussed below).

Figure 15:
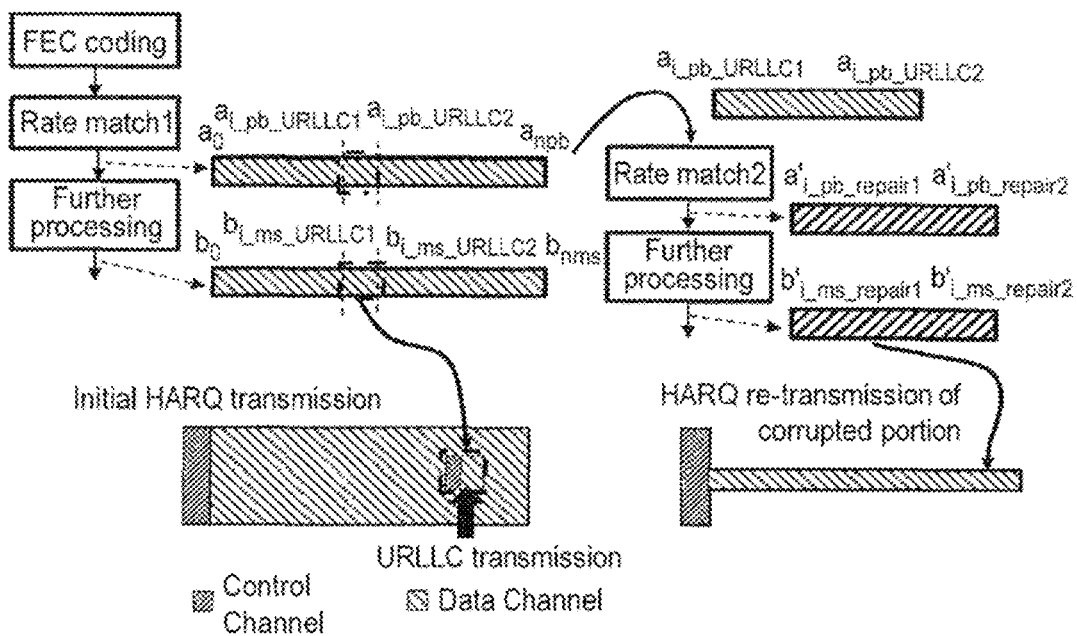
FIG. 15 illustrates an example rate-matching method for use in a retransmission.

The example discussed with respect to FIG. 14 can be generalised in the example illustrated in FIG. 15 considered with the following parameter table:

| Parameter | meaning |
| --- | --- |
| $n_{pb}$ | Number of physical bits in the initial transmission |
| $n_{ms}$ | Number of modulation symbols in the initial transmission |
| $i_{ms\_URLLC1}$ | Index of first modulation symbol corrupted by URLLC |
| $i_{ms\_URLLC2}$ | Index of last modulation symbol corrupted by URLLC |
| $i_{pb\_URLLC1}$ | Index of first physical bit corrupted by URLLC |
| $i_{pb\_URLLC2}$ | Index of last physical bit corrupted by URLLC |
| $i_{ms\_repair1}$ | Index of first modulation symbol in eMBB repair transmission |
| $i_{ms\_repair2}$ | Index of last modulation symbol in eMBB repair transmission |
| $i_{pb\_repair1}$ | Index of first physical bit in eMBB repair transmission |
| $i_{pb\_repair2}$ | Index of last physical bit in eMBB repair transmission |

The skilled person will appreciate that the principles discussed in respect of FIG. 14 apply equally here such that, in this example:

The initial transmission is rate matched to create a set of physical bits $a_0 \ldots a_{npb}$ These physical bits are further processed to create a set of resource elements $b_0$ to $b_{nms}$. The further processing may consist of various operations, including mapping to modulation symbols (in this example, QPSK modulation is envisaged)

The portion of resource elements $b_{ims\_URLLC1} \ldots b_{ims\_URLLC2}$ were intended to be mapped to a portion of resource that is corrupted by a URLLC transmission For the HARQ re-transmission (the "eMBB repair" transmission), the physical bits $a_{ipb\_URLLC1} \ldots a_{ipb\_URLLC2}$ (corresponding to the resource elements that were corrupted by URLLC) are further rate matched, by a block labelled "rate match 2". In this example, these bits are repeated two times to create a physical bit stream $a'_{ipb\_repair1} \ldots a'_{ipb\_repair2}$.

The physical bits stream $a'_{ipb\_repair1} \ldots a_{ipb\_repair2}$ is further processed to produce a set of resource elements $b'_{ims\_repair1} \ldots b'_{ims\_repair2}$. Note that there are twice as many resource elements here as for the initial transmission ($b_{ims\_URLLC1} \ldots b_{ims\_URLLC2}$), hence this re-transmission is more robust than the initial transmission.

Accordingly, the physical bits of the eMBB transmission can be rate-matched differently when retransmitted with a view to improving the reliability of the retransmission. It is noteworthy that these rate-matching adaptation techniques may be used regardless of whether the retransmitted bits correspond exactly to that affected by the URLCC transmission (i.e. that in the resources allocated for the eMBB transmission but used for the URLLC transmission) or include additional resources (e.g. to correct channel estimation errors also caused by the URLLC collision).

While this previous example is directed to the rate matching of physical bits when generating the HARQ re-transmissions for the eMBB repair, in another example modulation symbols may be rate matched when generating HARQ re-transmissions for the eMBB repair. As for the physical bits rate matching example, these techniques may be used whether exactly the corrupted symbols are re-transmitted (or symbols corresponding to the corrupted symbols are re-transmitted) or whether additional symbols are also transmitted.

Figure 16:
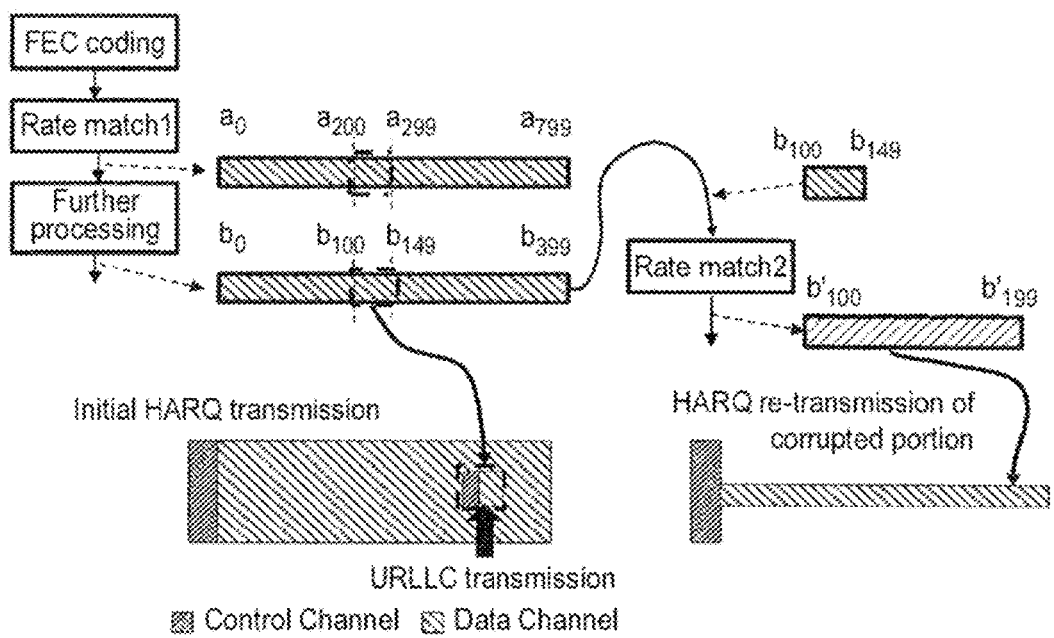
FIG. 16 illustrates an example rate-matching method for use in a retransmission.

This further example is illustrated with reference to FIG. 16 where a set of 800 physical bits (400 modulation symbols) is part of the original eMBB transmission wherein 100 physical bits (50 modulation symbols) of these are corrupted by a URLLC transmission. As for FIGS. 14 and 15, the skilled person can generalise this example to other lengths of eMBB bit streams and corrupting bit streams and to other rates for the rate matching. Returning to FIG. 16:

The initial transmission is rate matched to create a set of physical bits $a_0 \ldots a_{799}$ These physical bits are further processed to create a set of resource elements $b_0$ to $b_{399}$. The further processing may consist of various operations, including mapping to modulation symbols (in this example, QPSK modulation is envisaged)

The portion of resource elements $b_{100}$ to $b_{149}$ were intended to be mapped to a portion of resource that is corrupted by a URLLC transmission For the HARQ re-transmission (the "eMBB repair" transmission), the modulation symbols $b_{100}$ to $b_{149}$ (corresponding to the resource elements that were corrupted by URLLC) are further rate matched, by a block labelled "rate match 2". In this example, these modulation symbols are repeated twice to create a modulation symbol stream $b'_{100} \ldots b'_{199}$.

In this example, there are twice as many resource elements for the retransmission compared to the number of REs for the original transmission ($b_{100} \ldots b_{149}$) for the same portion of the eMBB data. As a result the robustness of the eMBB transmission has been improved in this re-transmission.

While conventionally the retransmissions are triggered by the transmission of a NACK message from a terminal, in accordance with one example of the present disclosure, the retransmission procedures can be sped up by automatically retransmitting the corrupted original transmission, regardless of whether the recipients (terminals) were actually able to decode and repair the corrupted transmission on their own.

It is noteworthy that in a conventional HARQ arrangement, a typical HARQ round trip time is generally of 8 subframes so that the UE is allowed time to decode the PDSCH, to generate an ACK/NACK, so that the eNodeB an receive and decode the ACK/NACK and schedule a HARQ re-transmission. In accordance with the present technique, the eNodeB may identify an eMBB transmission that has been corrupted by a URLLC transmission. Such an eMBB transmission is likely to cause a UE to send a NACK to the eNodeB and the HARQ round trip time can be shortened with the eNodeB sending an "eMBB repair" HARQ re-transmission straight after or shortly after sending the initial transmission. In this case the eNodeB can send the partial retransmission before any NACK is received (and as the skilled person will appreciate, potentially no NACK messages will in fact be sent). The reception of this "eMBB repair" transmission by the UE can be used in different ways.

The terminal may only make use of this re-transmission if it is unable to decode the first transmission, for example instead of sending a NACK message back the terminal it can use the re-transmission straightaway.

This re-transmission can trigger the UE to abort transport channel decoding of the corrupted transmission and to:
start physical channel processing of the "eMBB repair" transmission instead; and
then start transport channel processing of the combined initial transmission and eMBB repair transmission Accordingly, in accordance with the present disclosure retransmission techniques can be provided for assisting with the repair of the corruption of a first transmission by an urgent transmission using resources originally allocated for the first transmission, wherein the techniques can assist with a more efficient use of the network's resources and potentially with a quicker repair as well.

While the discussions above have generally been presented in the context of transmissions to one terminal being punctured however, as the skilled person will appreciate, the same principles apply if the transmissions to two or more terminals are being punctured. For example, the URLLC transmission may use some resources originally allocated for a data transmission to a first terminal or group of terminals as well as other resources originally allocated for a data transmission to a second terminal or group of terminals. In effect, it is not relevant to the recipient(s) of a punctured transmission that other transmissions might have been punctured as well, what is relevant to the recipient is which of its resources have been used to send other data instead of its data or superimposed with its data. The principles herein can thus be applied equally to puncturing/ superposition of transmissions to different recipients.

As the skilled person will appreciate, the terms terminal, UE, mobile device, mobile terminal, etc. can be used interchangeably and are not intended to be limiting. Likewise, the term base station has generally been used and is intended to include at least BTS, eNB, eNodeB, TRP, etc.

While the invention has generally been discussed in the context of downlink transmissions, it will be appreciated that the same principles may be used for uplink transmissions.

Thus there has been described a retransmission method for use in a telecommunications system, the method comprising: transmitting, to a terminal, first data in a set of identified resources allocated for the transmission of the first data; identifying that a portion of the identified resources has been used to transmit data other than the first data; and retransmitting a subset of the first data, the subset of the first data comprising the portion of the first data that was previously scheduled to be transmitted in the portion of the identified resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely illustrative embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

In the present disclosure, method steps discussed herein may be carried out in any suitable order and not necessarily in the order in which they are listed. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously (entirely or in part) or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a mobile terminal, a base station or any other mobile unit may be configured accordingly if appropriate, so long as it is technically feasible and not explicitly excluded.

Whenever the expressions "greater than" or "smaller than" or equivalent are used herein, it is intended that they discloses both alternatives "and equal to" and "and not equal to" unless one alternative is expressly excluded or is not technically relevant.

It is noteworthy that even though the present disclosure has been discussed in the context of LTE and/or 5G, its teachings are applicable to but not limited to LTE, 5G or to other 3GPP standards. In particular, even though the terminology used herein is generally the same or similar to that of the 5G standards, the teachings are not limited to the present version of 5G and could apply equally to any appropriate arrangement not based on 5G and/or compliant with any other future version of an 5G or 3GPP or other standard.

Respective features of the present disclosure are defined by the following numbered examples:

Example 1. A retransmission method for use in a mobile telecommunications system, the method comprising:
transmitting, to a terminal, first data in a set of identified resources allocated for the transmission of the first data;
identifying that a portion of the identified resources has been used to transmit data other than the first data; and
retransmitting a subset of the first data, the subset of the first data comprising the portion of the first data that was previously scheduled to be transmitted in the portion of the identified resources.

Example 2. The method of Example 1 further comprising: receiving an indication that the terminal has been unable to decode the first data from the set of identified resources; wherein, optionally, the identifying step is carried out upon receipt of the indication.

Example 3. The method of Example 1 or 2 wherein, upon determination by the terminal that the terminal is unable to decode the first data from the set of identified resources, the terminal attempts to decode the first data using at least a part of the transmission received in the set of identified resources and using the retransmission of the subset of the first data.

Example 4. The method of any preceding Example wherein the portion of the identified resources has been used to transfer either only the other data or both the other data and the first data.

Example 5. The method of any preceding Example wherein the subset of the first data corresponds exactly to the portion of the first data.

Example 6. The method of any of Examples 1 to 4 wherein the subset of the first data comprises more than the portion of the first data.

Example 7. The method of any preceding Example wherein retransmitting the subset of the first data comprises transmitting or retransmitting the physical bits that correspond to the physical bits that were scheduled to be transmitted in the set of identified resources for sending the subset of the first data.

Example 8. The method of any preceding Example wherein retransmitting the subset of the first data comprises transmitting or retransmitting the modulation symbols for sending the subset of the first data in the set of identified resources.

Example 9. The method of any of Examples 1 to 7 wherein retransmitting the subset of the first data comprises transmitting or retransmitting the subset of the first data using a retransmit rate matching procedure changing the robustness of the retransmission relative to the robustness provided by the transmit rate matching procedure used for sending the first data.

Example 10. The method of Example 9 wherein the rate-matching procedure is at least one of a physical bit rate matching procedure and a modulation symbol rate matching procedure.

Example 11. The method of any of Examples 1 to 7 wherein retransmitting the subset of the first data comprises transmitting or retransmitting the subset of the first data using an amount of resources that is different than the amount of resources used for transmitting the subset of the first data in the set of identified resources.

Example 12. The method of any preceding Example wherein the set of identified resources is in a first time unit and wherein retransmitting a subset of the first data comprises retransmitting the subset of the first data in a further set of identified resources, the further set of identified resources being a second time unit subsequent to the first time unit.

Example 13. A base station for use in a mobile telecommunications system, the base station being configured to:
transmit, to a terminal, first data in a set of identified resources allocated for the transmission of the first data;

identify that a portion of the identified resources has been used to transmit data other than the first data; and
retransmit a subset of the first data, the subset of the first data comprising the portion of the first data that was previously scheduled to be transmitted in the portion of the identified resources.

Example 14. The base station of Example 13 further configured to:
receive an indication that the terminal has been unable to decode the first data from the set of identified resources;
wherein, optionally, the base station is also configured to identify that a portion of the identified resources has been used to transmit data other than the first data upon receipt of the indication.

Example 15. The base station of any one of Examples 13 to 14 wherein, upon determination by the terminal that the terminal is unable to decode the first data from the set of identified resources, the terminal attempts to decode the first data using at least a part of the transmission received in the set of identified resources and using the retransmission of the subset of the first data.

Example 16. The base station of any one of Examples 13 to 15 wherein the portion of the identified resources has been used to transfer either only the other data or both the other data and the first data.

Example 17. The base station of any one of Examples 13 to 16 wherein the subset of the first data corresponds exactly to the portion of the first data.

Example 18. The base station of any one of Examples 13 to 16 wherein the subset of the first data comprises more than the portion of the first data.

Example 19. The base station of any one of Examples 13 to 18 wherein retransmitting the subset of the first data comprises transmitting or retransmitting the physical bits that correspond to the physical bits that were scheduled to be transmitted in the set of identified resources for sending the subset of the first data.

Example 20. The base station of any one of Examples 13 to 19 wherein retransmitting the subset of the first data comprises transmitting or retransmitting the modulation symbols for sending the subset of the first data in the set of identified resources.

Example 21. The method of any one of Examples 13 to 19 wherein retransmitting the subset of the first data comprises transmitting or retransmitting the subset of the first data using a retransmit rate matching procedure changing the robustness of the retransmission relative to the robustness provided by the transmit rate matching procedure used for sending the first data.

Example 22. The method of Example 21 wherein the rate-matching procedure is at least one of a physical bit rate matching procedure and a modulation symbol rate matching procedure.

Example 23. The base station of any one of Examples 13 to 19 wherein retransmitting the subset of the first data comprises transmitting or retransmitting the subset of the first data using an amount of resources that is different than the amount of resources used for transmitting the subset of the first data in the set of identified resources.

Example 24. The base station of any one of Examples 13 to 23 wherein the set of identified resources is in a first time unit and wherein retransmitting a subset of the first data comprises retransmitting the subset of the first data in a further set of identified resources, the further set of identified resources being a second time unit subsequent to the first time unit.

Example 25. A base station for use in a mobile telecommunications system, the base station being configured to carry out the method of any one of Examples 1 to 12.

Example 26. Circuitry for a base station for use in a mobile telecommunications system, wherein the circuitry comprises a controller element and a transceiver element configured to operate together to: transmit, to a terminal, first data in a set of identified resources allocated for the transmission of the first data;
identify that a portion of the identified resources has been used to transmit data other than the first data; and
retransmit a subset of the first data, the subset of the first data comprising the portion of the first data that was previously scheduled to be transmitted in the portion of the identified resources.

Example 27. Circuitry for a base station for use in a mobile telecommunications system, wherein the circuitry comprises a controller element and a transceiver element configured to operate together to carry out the method of any one of Examples 1 to 12.

Example 28. A method of using a terminal in a mobile telecommunications system, the method comprising:
receiving transmission data in a set of identified resources allocated for the transmission of first data to the terminal;
identifying that a portion of the identified resources has been used to transmit data other than the first data;
receiving retransmission data corresponding to a subset of the first data, the subset of the first data comprising the portion of the first data that was previously scheduled to be transmitted in the portion of the identified resources;
attempting to decode the first data based on the transmission data and on the retransmission data;

Example 29. The method of Example 28 further comprising one or more of:
upon receipt of the transmission information, attempting to decode the first data and, in the event that the decoding of the first data is unsuccessful, transmitting an indication that the terminal has been unable to decode the first data from the set of identified resources;
identifying that a portion of the identified resources has been used to transmit data other than the first data upon receipt of an indication that the portion of the identified resources has been used to transmit data other than the first data;
transmitting retransmission indication for requesting that the subset of the first data corresponds exactly to the portion of the first data or that the subset of the first data contains additional data compared to the portion of the first data.

Example 30. A terminal for use in a mobile telecommunications system, the terminal being configured to:
receive transmission data in a set of identified resources allocated for the transmission of first data to the terminal;
identify that a portion of the identified resources has been used to transmit data other than the first data;
receive retransmission data corresponding to a subset of the first data, the subset of the first data comprising the portion of the first data that was previously scheduled to be transmitted in the portion of the identified resources; and
attempt to decode the first data based on the transmission data and on the retransmission data.

Example 31. A terminal for use in a mobile telecommunications system, the terminal being configured to implement the method of Example 28 or 29.

Example 32. Circuitry for a terminal for use in a mobile telecommunications system, wherein the circuitry comprises a controller element and a transceiver element configured to operate together to:

receive transmission data in a set of identified resources allocated for the transmission of first data to the terminal;

identify that a portion of the identified resources has been used to transmit data other than the first data;

receive retransmission data corresponding to a subset of the first data, the subset of the first data comprising the portion of the first data that was previously scheduled to be transmitted in the portion of the identified resources; and attempt to decode the first data based on the transmission data and on the retransmission data.

Example 33. Circuitry for a terminal for use in a mobile telecommunications system, wherein the circuitry comprises a controller element and a transceiver element configured to operate together to carry out the method of Example 28 or 29.

REFERENCES

[1] RP-160671, "New SID Proposal: Study on New Radio Access Technology," NTT DOCOMO, RAN #71
[2] Holma H. and Toskala A, "LTE for UMTS OFDMA and SC-FDMA based radio access", John Wiley and Sons, 2009

What is claimed is:

1. Circuitry for a base station for use in a mobile telecommunications system, the circuitry comprising:
a transceiver; and
control circuitry configured to:
control the transceiver to transmit, to a terminal, first data in a set of identified resources allocated for the transmission of the first data;
identify whether a portion of the set of identified resources has been used to transmit data other than the first data during transmission of the first data; and
control the transceiver to retransmit, to the terminal in a case that the portion of the set of identified resources is identified to have been used to transmit the data other than the first data during the transmission of the first data, a subset of the first data without retransmission of a remainder of the first data.

2. The circuitry according to claim 1, wherein
the transceiver is configured to receive an indication that the terminal has been unable to decode the first data from the set of identified resources, and
the control circuitry identifies whether the portion of the set of identified resources has been used to transmit data other than the first data based on receipt of the indication.

3. The circuitry according to claim 1, wherein the control circuitry identifies that the portion of the set of identified resources has been used to transmit either only the data other than the first data or both the first data and the data other than the first data.

4. The circuitry according to claim 1, wherein the subset of the first data is transmitted exactly on the portion of the set of identified resources.

5. The circuitry according to claim 1, wherein the transceiver retransmits the subset of the first data by transmitting or retransmitting physical bits that were transmitted in the portion of the set of identified resources for sending the subset of the first data.

6. The circuitry according to claim 1, wherein the transceiver retransmits the subset of the first data by transmitting or retransmitting modulation symbols for sending the subset of the first data in the portion of the set of identified resources.

7. The circuitry according to claim 1, wherein the transceiver retransmits the subset of the first data by transmitting or retransmitting the subset of the first data using a retransmit rate matching procedure changing a robustness of the retransmission relative to a robustness provided by a transmit rate matching procedure used for sending the first data.

8. The circuitry according to claim 7, wherein the retransmit rate-matching procedure is at least one of a physical bit rate matching procedure and a modulation symbol rate matching procedure.

9. The circuitry according to claim 1, wherein the transceiver retransmits the subset of the first data by transmitting or retransmitting the subset of the first data using a first amount of resources that is different than a second amount of resources used for transmitting the subset of the first data in the set of identified resources.

10. The circuitry according to claim 1, wherein the portion of the set of identified resources is in a first time unit, and the transceiver retransmits the subset of the first data by retransmitting the subset of the first data in a further set of identified resources, the further set of identified resources being a second time unit subsequent to the first time unit.

11. A method of using a terminal in a mobile telecommunications system, the method comprising:
receiving transmission of data in a set of identified resources allocated for a transmission of first data to the terminal, the data being separate from the first data;
identifying whether a portion of the set of identified resources has been used to transmit the data other than the first data during transmission of the first data;
receiving retransmission, in a case that the circuitry identifies that the portion of the set of identified resources has been used to transmit the data other than the first data during the transmission of the first data, a subset of the first data without receiving retransmission of a remainder of the first data; and
attempting to decode the first data based on the first data received in the transmission and the subset of the first data received in the retransmission.

12. The method according to claim 11, wherein
the attempting to decode the first data is performed upon receipt of transmission information, and
the method further comprises transmitting, in a case that the decoding of the first data is unsuccessful, an indication that the terminal has been unable to decode the first data from the set of identified resources.

13. The method according to claim 11, further comprising identifying that the portion of the set of identified resources has been used to transmit data other than the first data upon receipt of an indication that the portion of the set of identified resources has been used to transmit data other than the first data.

14. The method according to claim 11, further comprising transmitting retransmission indication for requesting that the subset of the first data corresponds exactly to the portion of the first data or that the subset of the first data contains additional data compared to the portion of the first data.

15. Circuitry for a terminal for use in a mobile telecommunications system, the circuitry comprising:
a transceiver configured to receive transmission of data in a set of identified resources allocated for a transmission of first data to the terminal, the data being separate from the first data; and
control circuitry configured to identify whether a portion of the set of identified resources has been used to transmit the data other than the first data during transmission of the first data, wherein the transceiver is further configured to receive retransmission, in a case that the circuitry identifies that the portion of the set of identified resources has been used to transmit the data other than the first data during the transmission of the first data, a subset of the first data without receiving retransmission of a remainder of the first data, and the control circuitry is further configured to attempt to decode the first data based on the first data received in the transmission and the subset of the first data received in the retransmission.

16. The circuitry according to claim 15, wherein the control circuitry attempts to decode the first data upon receipt of transmission information, and in a case that that the control circuitry is unsuccessful in decoding of the first data, the transceiver transmits an indication that the terminal has been unable to decode the first data from the set of identified resources.

17. The circuitry according to claim 15, wherein the control circuitry is further configured to identify whether the portion of the set of identified resources has been used to transmit data other than the first data upon receipt of an indication that the portion of the set of identified resources has been used to transmit data other than the first data.

18. The circuitry according to claim 15, wherein the transceiver is further configured to transmit a retransmission indication for requesting that the subset of the first data corresponds exactly to the portion of the first data or that the subset of the first data contains additional data compared to the portion of the first data.

19. The circuitry according to claim 15, wherein the subset of the first data is retransmitted by transmission or retransmission of physical bits that were transmitted in the portion of the set of identified resources for sending the subset of the first data.

20. The circuitry according to claim 15, wherein the subset of the first data is retransmitted by transmission or retransmission of modulation symbols for sending the subset of the first data in the portion of the set of identified resources.

* * * * *